Patented Mar. 18, 1941

2,235,787

UNITED STATES PATENT OFFICE 2,235,787

HALOGEN ACYL ALKYL HEXOSES

Elwood V. White, Moscow, Idaho, assignor to The Dow Chemical Company, Midland, Mich., a corporation of Michigan No Drawing. Application September 13, 1939, Serial No. 294,685

6 Claims. (Cl. 260—210)

The invention relates to new glucose compounds having the general formula

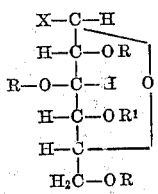

wherein at least one R is an alkyl or aralkyl group, and the remainder are acyl radicals, $R^1$ is an acyl radical and X is halogen. The invention also relates to the method whereby compounds having the aforesaid general formula may be produced.

Many methods have been proposed and employed with varying degrees of success to produce halogen acyl glucose, suitably by reaction of acyl bromides on glucose, halogen halides on acylated glucose, phosphorus pentachloride on acylated glucose, or by the action of a mixture of a hydrogen halide, acetic acid and acetic anhydride on a hexose. The successful preparation of halogen acyl hexose ethers from polysaccharide ethers has not been reported heretofore. Such compounds are desirable intermediates for numerous glucoside ethers whose preparation has not been possible heretofore.

It is a particular object of the invention to provide halogen acyl hexose ethers wherein at least one of the positions 2, 3 and 6 contains an alkyl or aralkyl etherifying substituent, the remainder of the 2, 3 and 6 positions being occupied by an acyl group, and the 4 position being occupied by an acyl radical. Compounds having the configuration as aforesaid are desired to provide intermediates for the preparation of useful and novel glucoside ethers suitable for use as plasticizers for the polysaccharide ethers such as the cellulose and starch ethers.

The compounds fulfilling the objects of the present invention may be obtained having the desired configuration and positional substitution by reacting upon a polysaccharide ether with a solution of an acyl halide, such as acetyl bromide, in a lower fatty acid, such as glacial acetic acid. The desired configuration is obtained owing to the fact that the process of acetylation and simultaneous halogenation of the polysaccharide ether ruptures the 1-4 glucosidic linkage in the polysaccharide ether molecule as shown by the following equation, wherein the accepted formula for tri-ethyl-cellulose is employed as representative of an ethylated polysaccharide

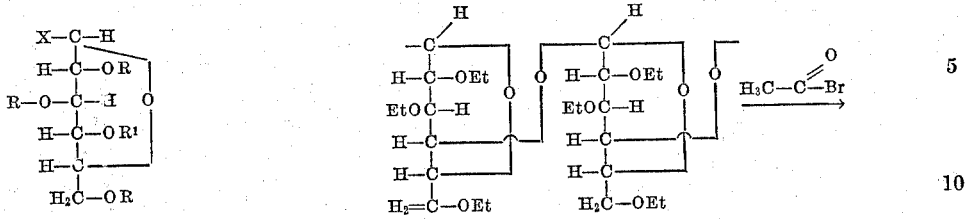

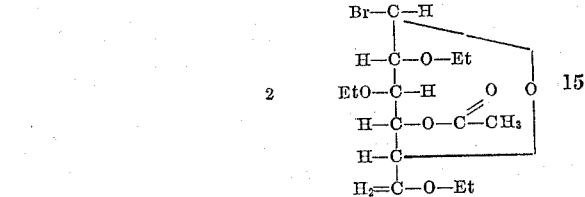

As is well known, cellulose and starch ethers are substituted in one or more of the 2, 3 or 6 positions of the glucose units making up their molecular structure. In general, such ethers contain mixtures of mono-, di-, and tri-etherified polysaccharides. Reaction upon such ethers with an acyl halide in accordance with the equation outlined above results in the preparation of completely substituted hexoses containing halogen in every 1 position, the acyl group in every 4 position, an ethyl group in at least one of the positions 2, 3 and 6, and halogen or an acyl group in the remainder of the 2, 3 and 6 positions.

The following example illustrates the practice of the invention in the preparation of a bromo acyl polyethyl ether of glucose:

100 grams of a commercially available purified ethyl cellulose having an ethoxyl content of 49.5 per cent was added with stirring in small portions to 150 cc. of glacial acetic acid containing 50 cc. of acetyl bromide dissolved therein. The temperature of the reaction mixture was held at or below 10° C. throughout the addition of the ethyl cellulose, and the resulting mixture was allowed to stand at about 8° C. for about 18 hours with occasional shaking. At the end of the stated reaction period, the reaction mixture was diluted with about 4 volumes of ethyl ether which had been cooled to 0° C. and the so-formed ether solution poured into a large excess (above 20 volumes) of ice water. Acetic acid, hydrogen bromide, and other water-soluble materials present in minor proportion were extracted by repeated washings of the ether layer with ice water until a negative test for bromide ion was obtained in the wash water. The ethereal solution contained a mixture of bromo diacetyl diethyl glucose and bromo mono-acetyl tri-ethyl glucose. The said solution was decolorized in known manner with charcoal, filtered, and dried over anhydrous sodium sulphate.

It is preferred to employ the halogen acyl hexose ethers of the type whose preparation is described in the example while they are relatively fresh, since these products are sensitive to light and heat, gradually liberating hydrogen halide. Their solutions may be stored in a cool place in dark glass containers, if desired, but this is usually accompanied by partial decomposition of the product.

The halogen acyl hexose ethers of the present invention may be prepared from polysaccharide ethers other than ethyl cellulose and may include as the halogen substituent either chlorine or bromine, and as the acetyl group radicals derived from propionic and butyric acids as well as from acetic acid, chloro-acetic acid and the like. For example, if propyl cellulose is reacted with acetyl chloride in the manner described above, there is obtained a chloro-acetyl propyl glucose containing the chlorine in the 1 position, an acetyl group in the 4 position, a propyl group in one or more of the 2, 3 and 6 positions, and the acetyl group in the remaining 2, 3 or 6 positions. In like manner, ethyl starch may be reacted with butyryl chloride to prepare a chloro butyryl ethyl glucose. The acylating and halogenating agent employed may contain in addition to the acyl halide a lower fatty acid such as acetic, propionic or butyric acid and, if desired, a lower fatty acid anhydride such as acetic, propionic or butyric anhydride. Instead, it may consist of the fatty acid, fatty acid anhydride, and dissolved hydrogen halide.

The use of the new compounds in the preparation of aryl acyl alkyl glucosides is described in my co-pending application, Serial No. 294,686, filed concurrently herewith.

I claim:

1. A compound having the general formula

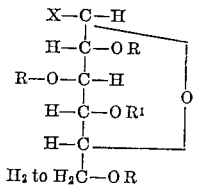

wherein at least one R is selected from the class consisting of alkyl and aralkyl radicals, the remainder of the radicals R being acyl groups, $R^1$ is an acyl radical, and X is one of the halogens chlorine and bromine.

2. A compound having the formula set forth in claim 1, wherein at least one of the groups represented by R is a lower alkyl radical.

3. A compound having the formula set forth in claim 1, wherein an ethyl group is in at least one of the positions indicated by R.

4. A compound having the formula set forth in claim 1, wherein the halogen is bromine.

5. A compound having the formula set forth in claim 1, wherein the acyl radicals are acetyl.

6. A bromo acetyl ethyl glucose, wherein the 1 position is occupied by bromine, at least one of the 2, 3 and 6 positions is occupied by the ethyl group, the remainder of the 2, 3 and 6 positions being occupied by the acetyl group, and the 4 position is occupied by the acetyl group.

ELWOOD V. WHITE.

CERTIFICATE OF CORRECTION.

Patent No. 2,235,787. March 18, 1941.

ELWOOD V. WHITE.

It is hereby certified that error appears in the printed specification of the above numbered patent requiring correction as follows: Page 2, second column, line 16, claim 1, in the last line of the formula, strike out that portion reading "$H_2$ to"; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.